US00RE44101E

(19) United States
(12) Reissued Patent
Hopkins

(10) Patent Number: US RE44,101 E
(45) **Date of Reissued Patent: *Mar. 26, 2013**

(54) FLUORESCENT LAMP ASSEMBLY HAVING MULTIPLE SETTINGS AND METHOD

(75) Inventor: Thomas L. Hopkins, Mundelein, IL (US)

(73) Assignee: STMicroelectronics, Inc., Coppell, TX (US)

( * ) Notice: This patent is subject to a terminal disclaimer.

(21) Appl. No.: 13/077,826

(22) Filed: Mar. 31, 2011

Related U.S. Patent Documents

Reissue of:
(64) Patent No.: 7,541,745
Issued: Jun. 2, 2009
Appl. No.: 11/986,460
Filed: Nov. 21, 2007

U.S. Applications:
(62) Division of application No. 11/059,955, filed on Feb. 17, 2005, now Pat. No. 7,323,823.

(51) Int. Cl.
*H05B 37/02* (2006.01)

(52) U.S. Cl. ..... 315/224; 315/219; 315/307; 315/308

(58) Field of Classification Search ..... 315/219, 315/224, 225, 226, 291, 306, 307, 308, DIG. 2, 315/DIG. 5, DIG. 7
See application file for complete search history.

(56) References Cited

U.S. PATENT DOCUMENTS

| | | | | |
|---|---|---|---|---|
| 5,302,920 | A | 4/1994 | Bitting | |
| 5,424,613 | A | 6/1995 | Moriarty, Jr. | |
| 5,747,942 | A | 5/1998 | Ranganath | |
| 5,798,620 | A | 8/1998 | Wacyk et al. | |
| 6,072,284 | A | 6/2000 | Lin | |
| 6,700,331 | B2 * | 3/2004 | Benensohn | 315/224 |
| 6,791,285 | B2 * | 9/2004 | Greenwood et al. | 315/307 |
| 2004/0032222 | A1 | 2/2004 | Green | |
| 2004/0077327 | A1 | 4/2004 | Lim et al. | |
| 2004/0113564 | A1 * | 6/2004 | Glaser et al. | 315/224 |

OTHER PUBLICATIONS

Ricardo N. Do Prado et al., "Designing a Dimmable High Power Factor Electronic Ballast for Fluorescent Lamps," 1999 IEEE, pp. 1115-1120.

* cited by examiner

*Primary Examiner* — David H Vu
(74) *Attorney, Agent, or Firm* — Munck Wilson Mandala, LLP

(57) ABSTRACT

A fluorescent lamp assembly includes a fluorescent lamp ballast capable of detecting at least one of a plurality of input signals and generating an output signal. The output signal is associated with a power level that is based on the at least one detected input signal. The fluorescent lamp assembly also includes a fluorescent lamp capable of receiving the output signal and generating light. An intensity of the light is based on the power level associated with the output signal.

20 Claims, 2 Drawing Sheets

FLUORESCENT LAMP ASSEMBLY HAVING MULTIPLE SETTINGS AND METHOD

Matter enclosed in heavy brackets [ ] appears in the original patent but forms no part of this reissue specification; matter printed in italics indicates the additions made by reissue.

This application is a divisional of prior U.S. patent application Ser. No. 11/059,955 filed on Feb. 17, 2005 now U.S. Pat. No. 7,323,823.

TECHNICAL FIELD

This disclosure is generally directed to fluorescent lighting systems and more specifically to a fluorescent lamp assembly having multiple settings and method.

BACKGROUND

Incandescent light bulbs or lamps are often capable of producing different levels of illumination. For example, conventional three-way incandescent lamps are often capable of producing light at three different intensities. As a specific example, conventional three-way incandescent lamps typically include two different filaments, such as a fifty watt filament and a one hundred watt filament. A conventional three-way incandescent lamp is typically inserted into a base structure that includes two switches, each switch capable of connecting one of the filaments to a power supply. Different combinations of opened and/or closed switches may produce light outputs of fifty watts from the first filament, one hundred watts from the second filament, or one hundred fifty watts from both filaments.

This type of base structure is typically not suited for use with conventional fluorescent lamps. Typical fluorescent lamp bases or "ballasts" operate by rectifying alternating current ("AC") inputs and then using a high frequency inverter to drive fluorescent tubes. As a result, a conventional base structure that uses different switches to connect a fluorescent lamp to a power supply would be incapable of altering the light intensity produced by the fluorescent lamp. This is due to the fact that the AC inputs would be rectified and the same inverter would drive the fluorescent lamp regardless of the switch settings.

SUMMARY

This disclosure provides a fluorescent lamp assembly having multiple settings and method.

In one aspect, a fluorescent lamp assembly includes a fluorescent lamp ballast capable of detecting at least one of a plurality of input signals and generating an output signal. The output signal is associated with a power level that is based on the at least one detected input signal. The fluorescent lamp assembly also includes a fluorescent lamp capable of receiving the output signal and generating light. An intensity of the light is based on the power level associated with the output signal.

In another aspect, a fluorescent lamp ballast includes a detector capable of detecting at least one of a plurality of input signals. The fluorescent lamp ballast also includes an oscillator capable of generating a signal having a frequency based on the at least one detected input signal. The fluorescent lamp ballast further includes an amplifier capable of amplifying the signal generated by the oscillator to produce an amplified signal. In addition, the fluorescent lamp ballast includes a tank circuit capable of generating an output signal using the amplified signal and providing the output signal to a fluorescent lamp. The output signal is associated with a power level that is based on the frequency of the amplified signal. The fluorescent lamp is capable of receiving the output signal and generating light, where an intensity of the light is based on the power level associated with the output signal.

In yet another aspect, a method includes detecting at least one of a plurality of input signals at a fluorescent lamp ballast. The method also includes selecting an operating frequency of the fluorescent lamp ballast based on the at least one detected input signal. In addition, the method includes providing power to a fluorescent lamp based on the operating frequency of the fluorescent lamp ballast. The fluorescent lamp is capable of generating light having an intensity that is based on the power provided to the fluorescent lamp.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
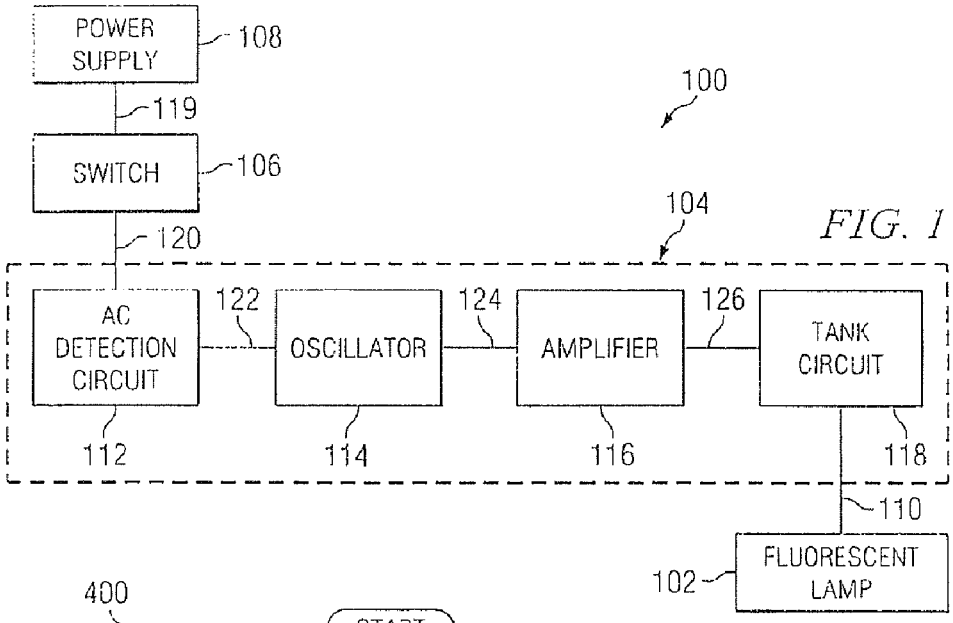
FIG. 1 illustrates an example fluorescent lamp assembly having multiple settings according to one embodiment of this disclosure.

FIG. 1 illustrates an example fluorescent lamp assembly 100 having multiple settings according to one embodiment of this disclosure. The embodiment of the fluorescent lamp assembly 100 shown in FIG. 1 is for illustration only. Other embodiments of the fluorescent lamp assembly 100 may be used without departing from the scope of this disclosure.

In this example, the fluorescent lamp assembly 100 includes a fluorescent lamp 102, a fluorescent lamp ballast 104, a switch 106, and a power supply 108. The fluorescent lamp 102 receives a voltage signal 110 from the fluorescent lamp ballast 104 and generates light using the voltage signal 110. The fluorescent lamp 102 represents any lamp or collection of lamps capable of generating light. For example, the fluorescent lamp 102 could represent one or more lamps that use argon and mercury vapor to generate visible light.

The fluorescent lamp ballast 104 is coupled to the fluorescent lamp 102 and the switch 106. The fluorescent lamp ballast 104 receives power from the power supply 108 through the switch 106. The fluorescent lamp ballast 104 also generates and provides a voltage signal 110 to the fluorescent lamp 102, which uses the voltage signal 110 to generate light. In addition, the fluorescent lamp ballast 104 alters the power provided by the voltage signal 110, which adjusts the intensity of light produced by the fluorescent lamp 102. The fluorescent lamp ballast 104 includes any hardware, software, firmware, or combination thereof for generating signals 110 used by a fluorescent lamp 102 to generate light.

In the illustrated example, the fluorescent lamp ballast 104 includes an alternating current ("AC") detection circuit 112, an oscillator 114, an amplifier 116, and a tank circuit 118. The switch 106 is coupled to the power supply 108 and the detection circuit 112. The switch 106 receives an input power signal 116 from the power supply 108. The switch 106 also provides one or more AC signals 120 to the detection circuit 112, and the detection circuit 112 detects the presence of any of the AC signals 120. The AC signals 120 represent the desired setting or illumination level of the fluorescent lamp 102.

In some embodiments, the switch 106 provides up to N different AC signals 120, which represent $2^N$ possible settings of the fluorescent lamp 102. For example, the switch 106 may provide up to two different AC signals 120 that represent four different settings. In this example, each setting could be associated with an intensity of light produced by the fluorescent lamp 102. As a particular example, when no AC signals 120 are output by the switch 106, the fluorescent lamp 102 may be turned off. When only a first AC signal 120 is output by the switch 106, the fluorescent lamp 102 may generate light having a first, lower intensity. When only a second AC signal 120 is output by the switch 106, the fluorescent lamp 102 may generate light having a second, higher intensity. When both AC signals 120 are output by the switch 106, the fluorescent lamp 102 may generate light having a maximum intensity. In this document, the term "each" refers to every of at least a subset of the identified item.

The switch 106 represents any structure capable of outputting one or multiple signals representing multiple settings of a fluorescent lamp 102. For example, the switch 106 could represent a combination of switches, each of which receives the input power signal 119, that may be opened or closed to provide the desired number of AC signals 120. As a particular example, the switch 106 could act as a three-way switch that provides three different intensity settings and an additional "off" setting.

The detection circuit 112 is coupled to the switch 106 and the oscillator 114. The detection circuit 112 detects the presence or absence of the AC signals 120 from the switch 106. The detection circuit 112 then generates one or more oscillator control signals 122 based on any detected AC signals 120. For example, the detection circuit 112 could enable one of multiple oscillator control signals 122, depending on which AC signals 120 are detected. The oscillator control signals 122 identify the frequency of a signal to be produced by the oscillator 114.

As described above, in some embodiments, the switch 106 outputs up to two different AC signals 120. In particular embodiments, the detection circuit 112 outputs three different oscillator control signals 122. In these embodiments, if only the first AC signal 120 is detected, the detection circuit 112 enables a first of the oscillator control signals 122. If only the second AC signal 120 is detected, the detection circuit 112 enables a second of the oscillator control signals 122. If both AC signals 120 are detected, the detection circuit 112 enables a third of the oscillator control signals 122. The detection circuit 112 provides the oscillator control signals 122 to the oscillator 114, which uses the control signals 122 to generate a signal at an appropriate frequency.

Figure 2:
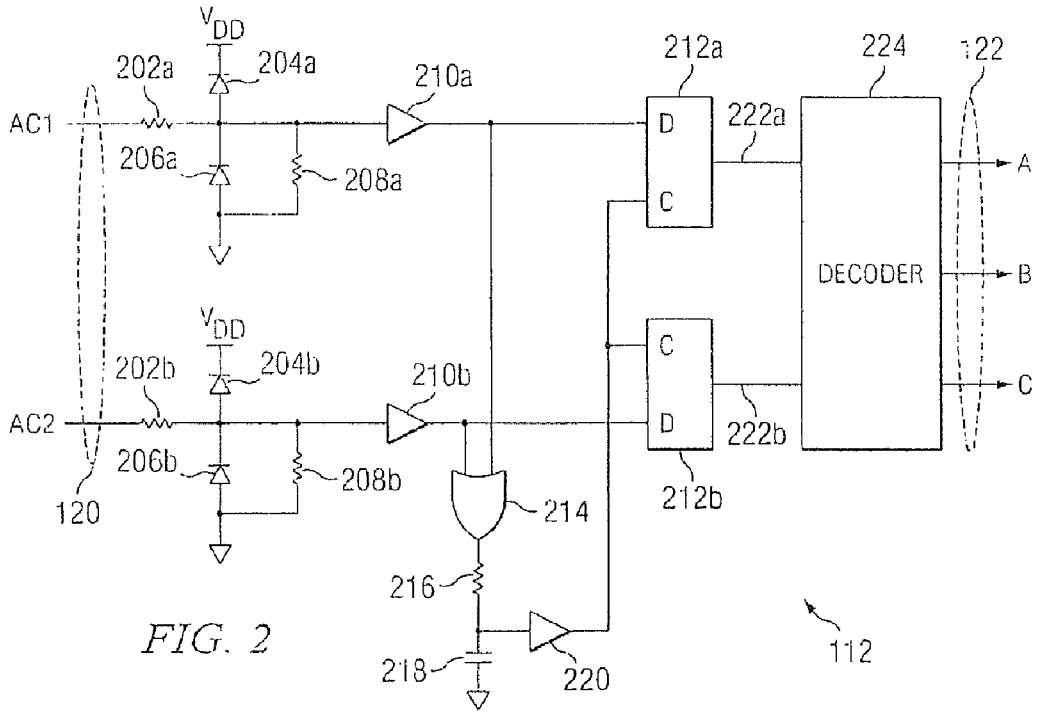
FIG. 2 illustrates an example detection circuit in a fluorescent lamp assembly having multiple settings according to one embodiment of this disclosure.

The detection circuit 112 represents any hardware, software, firmware, or combination thereof for detecting one or multiple inputs and generating one or more control signals. One example embodiment of the detection circuit 112 is shown in FIG. 2, which is described below. In some embodiments, the detection circuit 112 is arranged so it can be connected to a conventional base structure used to connect an incandescent lamp to a power supply.

The oscillator 114 is coupled to the detection circuit 112 and the amplifier 116. The oscillator 114 generates a signal 124 that is provided to the amplifier 116. The frequency of the signal 124 represents the operating frequency of the fluorescent lamp ballast 104. The frequency of the signal 124 is based, at least in part, on the oscillator control signals 122 received from the detection circuit 112. For example, the oscillator 114 could generate a signal 124 having one of three different frequencies, and three oscillator control signals 122 identify which of the three frequencies is used by the oscillator 114. The frequency of the signal 124 may control the intensity of light produced by the fluorescent lamp 102. By adjusting the frequency of the signal 124, the intensity of light generated by the fluorescent lamp 102 is also adjusted.

The oscillator 114 may use any suitable technique to alter the frequency of the signal 124. For example, the oscillator 114 could use an adjustable capacitance and/or an adjustable resistance to alter the frequency of the signal 124. The oscillator 114 could also use an adjustable current source to charge a capacitor, where the current source is adjusted to alter the frequency of the signal 124. In addition, the oscillator 114 could represent a voltage controlled oscillator, where a control voltage is modified to provide the desired frequency.

Figure 3:
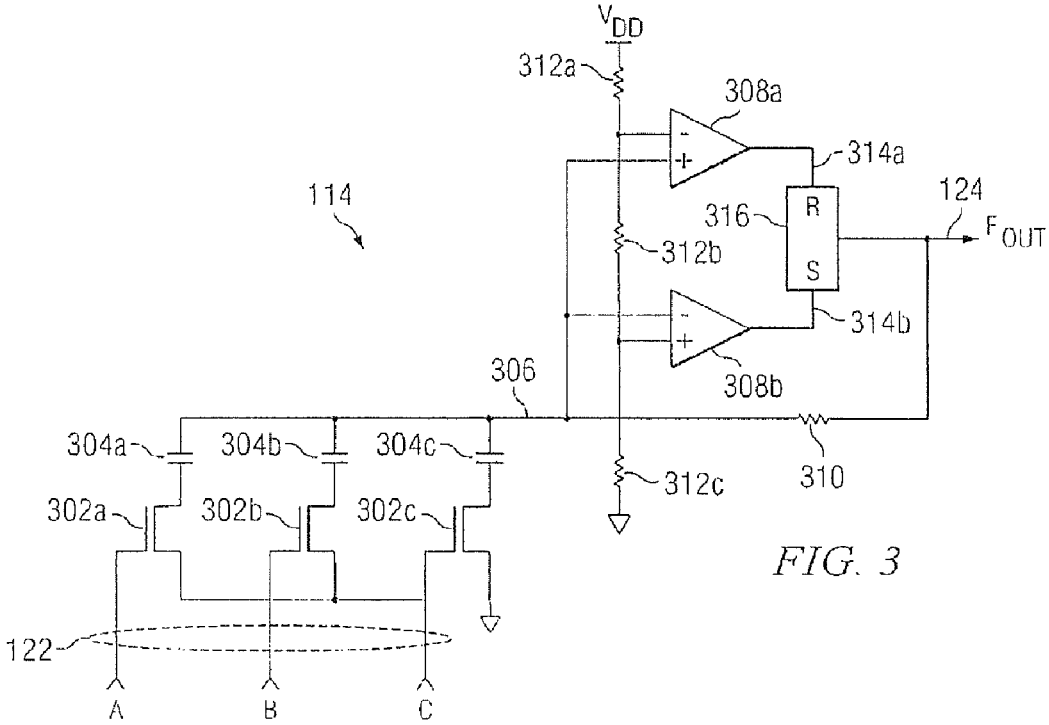
FIG. 3 illustrates an example oscillator in a fluorescent lamp assembly having multiple settings according to one embodiment of this disclosure.

The oscillator 114 represents any hardware, software, firmware, or combination thereof for generating a signal having a controllable frequency. One example embodiment of the oscillator 114 is shown in FIG. 3, which is described later herein.

The amplifier 116 is coupled to the oscillator 114 and the tank circuit 118. The amplifier 116 receives the signal 124 generated by the oscillator 114 and amplifies the signal 124. The amplifier 116 then outputs an amplified signal 126, which is provided to the tank circuit 118. The amplifier 116 represents any suitable amplifier capable of amplifying signals, such as a power amplifier.

The tank circuit 118 is coupled to the amplifier 116 and the fluorescent lamp 102. The tank circuit 118 receives the amplified signal 126 from the amplifier 116 and generates the voltage signal 110. The fluorescent lamp 102 uses the voltage signal 110 to generate light. For example, the voltage signal 110 may energize the fluorescent lamp 102 and cause the fluorescent lamp 102 to produce light. The tank circuit 118 also allows the fluorescent lamp ballast 104 to adjust the intensity of light generated by the fluorescent lamp 102. As an example, varying the frequency of the amplified signal 126 causes the tank circuit 118 to generate voltage signals 110 having different power levels at different frequencies. Because the fluorescent lamp ballast 104 provides voltage signals 110 at different power levels, the fluorescent lamp 102 generates light at different intensities. As a result, by adjusting the frequency of the signal 124 produced by the oscillator 114, the intensity of light generated by the fluorescent lamp 102 is also adjusted.

The tank circuit 118 includes any hardware, software, firmware, or combination thereof for generating voltage signals having different power levels. The tank circuit 118 may, for example, represent an inductor-capacitor ("LC") resonant tank circuit.

The power supply 108 is coupled to the fluorescent lamp ballast 104 through the switch 106. The power supply 108 provides operating power for the fluorescent lamp assembly 100. The power supply 108 could represent any power supply, such as an AC power supply. Although shown as part of the fluorescent lamp assembly 100, the power supply 108 could reside external to the fluorescent lamp assembly 100 and be coupled to the fluorescent lamp ballast 104 or the switch 106 by a power cord or other coupler.

The fluorescent lamp assembly 100 shown in FIG. 1 is capable of adjusting the intensity of light generated by the fluorescent lamp 102. A user sets the switch 106 to an appropriate setting, and the switch 106 produces one or more AC signals 120, such as a combination of up to N different AC signals 120. In this document, the term "combination" refers to at least one of two or more elements. The detection circuit 112 detects the AC signal(s) 120 and generates one or more oscillator control signals 122 that correspond to the selected setting. The oscillator 114 generates a signal 124 having a frequency corresponding to the oscillator control signals 122. The signal 124 is amplified and provided to the tank circuit 126, which uses the amplified signal 126 to generate a voltage signal 110. The voltage signal 110 provides power to the fluorescent lamp 102, and the fluorescent lamp 102 generates light. The amount of power provided by the voltage signal 110 is dependent on the frequency of the signal 124, and the amount of power controls the intensity of light produced by the fluorescent lamp 102. This process may be repeated if and when the user changes the setting of the switch 106. In this way, the intensity of light generated by the fluorescent lamp 102 may be controlled and adjusted. Moreover, this mechanism may operate in conjunction with conventional base structures ordinarily used to control incandescent lamps.

Although FIG. 1 illustrates one example of a fluorescent lamp assembly 100 having multiple settings, various changes may be made to FIG. 1. For example, the functional division shown in FIG. 1 is for illustration only. Various components in FIG. 1 may be combined or omitted and additional components could be added according to particular needs.

FIG. 2 illustrates an example detection circuit 112 in a fluorescent lamp assembly 100 having multiple settings according to one embodiment of this disclosure. The embodiment of the detection circuit 112 shown in FIG. 2 is for illustration only. Other embodiments of the detection circuit 112 may be used in the fluorescent lamp assembly 100 without departing from the scope of this disclosure.

In this example, the detection circuit 112 detects the presence of up to two different AC input signals 120. The AC input signals 120 represent the signals provided by the switch 106 in FIG. 1. The detection circuit 112 then generates three different control signals 122. The control signals 122 represent the signals provided to the oscillator 114 in FIG. 1.

In this example embodiment, the first AC input signal ("AC1") 120 is provided to a resistor 202a, and the second AC input signal ("AC2") 120 is provided to a resistor 202b. The resistor 202a is coupled to a diode 204a, a diode 206a, a pull-down resistor 208a, and a buffer 210a. Similarly, the resistor 202b is coupled to a diode 204b, a diode 206b, a pull-down resistor 208b, and a buffer 210b, The diodes 204a-204b are coupled to a source voltage $V_{DD}$, and the diodes 206a-206b and the pull-down resistors 208a-208b are coupled to ground. The resistors 202a-202b, 208a-208b may have any suitable resistances. For example, the resistors 202a-202b could represent 100 kΩ resistors, and the pull-down resistors 208a-208b could represent 10 kΩ resistors. Also, the diodes 204a-204b, 206a-206b could represent any suitable diodes. Further, the buffers 210a-210b could represent any suitable buffers, such as one or more operational amplifiers. In addition, the source voltage $V_{DD}$ could represent any suitable voltage, such as a voltage between five volts and twenty volts inclusive.

The buffers 210a-210b are coupled to two flip-flops 212a-212b, respectively, and to an OR gate 214. The OR gate 214 is coupled to a resistor 216, which is coupled to a capacitor 218 and a buffer 220. The buffer 220 is also coupled to the flip-flops 212a-212b.

The flip-flops 212a-212b receive and sample outputs produced by the buffers 210a-210b. The flip-flops 212a-212b represent any hardware, software, firmware, or combination thereof capable of sampling and holding an input value. As a particular example, the flip-flops 212a-212b may represent D flip-flops, where the "D" inputs receive the outputs of the buffers 210a-210b and the clock or "C" inputs receive the output of the buffer 220.

The resistor 216 and the capacitor 218 may have any suitable resistance and capacitance, respectively. For example, the resistor 216 and the capacitor 218 could provide a delay in the detection circuit 112. Any suitable delay may be provided, such as a delay of one or several milliseconds or tens of microseconds. The resistance and capacitance of the resistor 216 and the capacitor 218 could be selected to provide the appropriate delay.

The flip-flops 212a-212b in the detection circuit 112 generate two signals 222a-222b. The signals 222a-222b indicate the presence or absence of the AC signals 120. For example, if both AC signals 120 are present, both signals 222a-222b may have a high logical value. If only one of the AC signals 120 is present, one of the signals 222a-222b may have a high logical value and the other may have a low logical value.

The signals 222a-222b are provided to a decoder 224. The decoder 224 uses the signals 222a-222b to generate the control signals 122 for the oscillator 114. For example, the decoder 224 could generate a high logical value in one of the control signals 122 depending on which of the AC signals 120 are present. The control signals 122 are then provided to the oscillator 114, which generates a signal 124 having a frequency that is based on the control signals 122.

As a specific example, if the signal 222a has a high logical value but the signal 222b has a low logical value, this may indicate that the first AC signal 120 is present but the second AC signal 120 is not. In this case, the first control signal ("A") 122 may have a high logical value and the other two control signals 122 may have a low logical value. If the signal 222a has a low logical value and the signal 222b has a high logical value, this may indicate that the second AC signal 120 is present but the first AC signal 120 is not. In that case, the second control signal ("B") 122 may have a high logical value and the other control signals 122 may have a low logical value. In addition, if both signals 222a-222b have a high logical value, this may indicate that both AC signals 120 are present. The third control signal ("C") 122 may have a high logical value while the other controls signals 120 have a low logical value. This represents one possible way in which the decoder 224 generates the control signals 122. The decoder 224 may use other techniques to generate the control signals 122 depending on, for example, the mechanism used by the oscillator 114 to adjust the frequency of the signal 124.

The decoder 224 includes any hardware, software, firmware, or combination thereof for generating control signals. In some embodiments, the switch 106 in FIG. 1 provides a different combination of AC input signals 120 for different settings, and the decoder 224 generates control signals 122 that correspond to the different settings of the switch 106.

Although FIG. 2 illustrates one example of a detection circuit 112 in a fluorescent lamp assembly 100 having multiple settings, various changes may be made to FIG. 2. For example, the detection circuit 112 could be used to detect the presence or absence of any suitable number of AC input signals 120. Also, other embodiments of the detection circuit 112 may be used to detect the presence or absence of one or more AC input signals.

FIG. 3 illustrates an example oscillator 114 in a fluorescent lamp assembly 100 having multiple settings according to one embodiment of this disclosure. The embodiment of the oscillator 114 shown in FIG. 3 is for illustration only. Other embodiments of the oscillator 114 may be used in the fluorescent lamp assembly 100 without departing from the scope of this disclosure.

In this example, the oscillator 114 receives three control signals 122 from the detection circuit 112. The control signals 122 collectively represent one of multiple frequencies, and the oscillator 114 generates a signal 124 having the frequency identified by the control signals 122.

In this example embodiment, the control signals 122 are provided to three transistors 302a-302c. In particular, the control signals 122 are provided to the gates of the transistors 302a-302c. The sources of the transistors 302a-302c are coupled to one another and to ground, and the drains of the transistors 302a-302c are coupled to capacitors 304a-304c, respectively. The transistors 302a-302c represent any suitable transistors, such as field effect transistors ("FETs").

A signal 306 is provided to two comparators 308a-308b and a resistor 310. The signal 306 represents the voltage stored on the capacitors 304a-304c. The comparators 308a-308b also receive different reference voltages produced by a voltage divider represented by three resistors 312a-312c, which are coupled in series between a source voltage $V_{DD}$ and ground. The comparators 308a-308b compare two input voltages (one of the reference voltages and the signal 306) and generate two output signals 314a-314b. Each of the output signals 314a-314b indicates whether the voltage received at the positive terminal of the corresponding comparator exceeds the voltage at the negative terminal. The comparators 308a-308b represent any hardware, software, firmware, or combination thereof for comparing voltages. Also, the resistors 312a-312b may have any suitable resistance(s), such as a resistance of 10 kΩ each.

The output signals 314a-314b produced by the comparators 308a-308b are provided to an RS flip-flop 316. Through the "R" input, the RS flip-flop 316 is configured so that it is reset when the voltage stored on the capacitors 304a-304c exceeds two thirds of the source voltage $V_{DD}$. Through the "S" input, the RS flip-flop 316 is configured so that it is set when the voltage stored on the capacitors 304a-304c exceeds one third of the source voltage $V_{DD}$. In this way, the RS flip-flop 316 acts as a bi-stable oscillator and produces the signal 124.

In this embodiment, the frequency of the signal 124 produced by the RS flip-flop 316 depends on the capacitance of the capacitors 304a-304c and the resistance of the resistor 310. In this example, the resistance of the resistor 310 is fixed, and the capacitance of the capacitors 304a-304c varies depending on which of the transistors 302a-302c is conductive.

In some embodiments, only one of the control signals 122 may be enabled at any given time. This allows the oscillator 114 to produce up to three different frequencies in the signal 124. In these embodiments, the capacitors 304a-304c may have different capacitances. By enabling different ones of the transistors 302a-302c, the capacitance, provided by the RC network (formed of capacitors 304a-304c and resistor 310) may vary.

In other embodiments, multiple ones of the control signals 122 may be enabled at any given time. This allows the oscillator 114 to produce up to eight different frequencies in the signal 124. In these embodiments, different combinations of capacitors 304a-304c may be used in the RC network by enabling different combinations of transistors 302a-302. This also varies the capacitance in the RC network.

Altering the capacitance in the RC network varies the speed at which the charge on the capacitors 304a-304c exceeds one third of the supply voltage $V_{DD}$ and two thirds of the supply voltage $V_{DD}$. For a lower frequency, the capacitors 304a-304c charge more slowly, which lengthens the amount of time between setting and resetting the RS flip-flop 316. Similarly, for a higher frequency, the capacitors 304a-304c charge more quickly, decreasing the amount of time between setting and resetting the RS flip-flop 316.

Although FIG. 3 illustrates one example of an oscillator 114 in a fluorescent lamp assembly 100 having multiple settings, various changes may be made to FIG. 3. For example, FIG. 3 illustrates the use of three capacitors 304a-304c that can be individually selected or selected in combination based on three control signals 122. In other embodiments, the oscillator 114 could include a different number of capacitors that can be selected individually or in combination based on any number of control signals 122. Also, the oscillator 114 could support any number of operating frequencies represented using any number and/or combination of capacitors. Further, other mechanisms may be used to adjust the operating frequency of the oscillator 114 instead of or in addition to adjusting the capacitance in the oscillator 114. These other mechanisms include, for example, adjusting the resistance of the resistor 310 and using an adjustable current source to charge one or more of the capacitors 304a-304c. In addition, other embodiments of the oscillator 114 may be used, such as by using a voltage controlled oscillator where a control voltage may be modified to provide the desired frequency.

Figure 4:
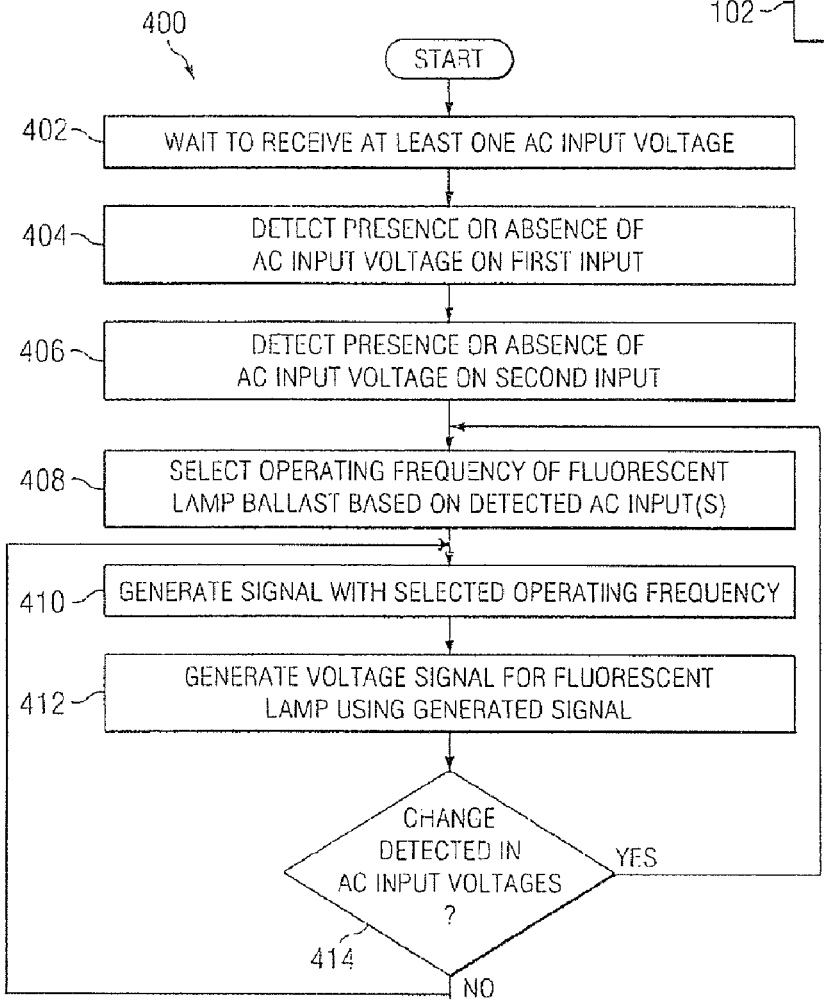
FIG. 4 illustrates an example method for providing multiple settings in a fluorescent lamp assembly according to one embodiment of this disclosure.

FIG. 4 illustrates an example method 400 for providing multiple settings in a fluorescent lamp assembly according to one embodiment of this disclosure. For ease of explanation, the method 400 is described with respect to the fluorescent lamp assembly 100 in FIG. 1. The method 400 could be used with any other lamp assembly without departing from the scope of this disclosure.

The fluorescent lamp assembly 100 waits to receive at least one AC input voltage at step 402. Until at least one AC input voltage 120 is received, the fluorescent lamp assembly 100 may perform no actions. In particular, until at least one AC input voltage 120 is received, the fluorescent lamp assembly 100 (particularly the fluorescent lamp ballast 104) may lack power to perform any actions.

Once at least one AC input voltage is received, the fluorescent lamp assembly 100 detects the presence or absence of a first AC input voltage on a first input at step 404. This may include, for example, the detection circuit 112 detecting the presence or absence of a first AC signal ("AC1") 120. The fluorescent lamp assembly 100 detects the presence or absence of a second AC input voltage on a second input at step 406. This may include, for example, the detection circuit 112 detecting the presence or absence of a second AC signal ("AC2") 120.

The fluorescent lamp assembly 100 selects an operating frequency of the fluorescent lamp ballast at step 408. This may include, for example, the detection circuit 112 generating one or multiple control signals 122 based on the detected AC input signal(s) 120. As a particular example, this may include the detection circuit 112 enabling a first control signal ("A") 122 if only the first AC input signal 120 is detected, enabling a second control signal ("B") 122 if only the second AC input signal 120 is detected, and enabling a third control signal ("C") 122 if both AC input signals 120 are detected.

This may also include the oscillator 114 using the control signals 122 to adjust the capacitance used by the oscillator 114.

The fluorescent lamp assembly 100 generates a signal having the selected operating frequency at step 410. This may include, for example, the oscillator 114 generating a signal 124 using the capacitance selected using the control signals 122.

The fluorescent lamp assembly 100 generates a voltage signal for a fluorescent lamp using the generated signal at step 412. This may include, for example, the oscillator 114 providing the generated signal 124 to the amplifier 116 for power amplification. This may also include the amplifier 116 providing the amplified signal 126 to the tank circuit 118. This may further include the tank circuit 118 generating a voltage signal 110 and providing the voltage signal 110 to the fluorescent lamp 102. The voltage signal 110 has a power level based on the frequency of the amplified signal 126. The power provided by the voltage signal 110 determines the intensity of light generated by the fluorescent lamp 102.

If and when one of the AC input voltages changes at step 414, the fluorescent lamp assembly 100 returns to step 408 to select a new operating frequency and generate a new voltage signal 110 providing the appropriate power level. This may include, for example, the detection circuit 112 detecting the presence of a new AC input signal 120 or the absence of an existing AC input signal 120. This alters the intensity of light produced by the fluorescent lamp 102.

Although FIG. 4 illustrates one example of a method 400 for providing multiple settings in a fluorescent lamp assembly, various changes may be made to FIG. 4. For example, the detection steps 404-406 may occur in parallel. Also, the fluorescent lamp 102 could be controlled by more than two AC input voltages.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:

detecting at least one of a plurality of input signals at a fluorescent lamp ballast;

selecting an operating frequency of the fluorescent lamp ballast by generating [at least one] *a plurality of* control [signal] *signals* based on the at least one detected input signal and setting at least one of a resistance and a capacitance in a resistor-capacitor (RC) network based on [the] at least one *of the* control [signal] *signals*, the RC network affecting the operating frequency of the fluorescent lamp ballast; and providing power to a fluorescent lamp based on the operating frequency of the fluorescent lamp ballast, the fluorescent lamp capable of generating light having an intensity that is based on the power provided to the fluorescent lamp.

2. The method of claim 1, wherein selecting the operating frequency comprises:

generating a signal at an oscillator based on the at least one control signal, the signal having the operating frequency, the oscillator comprising the RC network.

3. The method of claim 2, wherein providing power to the fluorescent lamp comprises:

amplifying the signal generated by the oscillator to produce an amplified signal;

generating a voltage signal using the amplified signal; and providing the voltage signal to the fluorescent lamp, the voltage signal providing the power to the fluorescent lamp.

4. The method of claim 1, further comprising:

selecting a second operating frequency of the fluorescent lamp ballast; and providing a different power to the fluorescent lamp based on the second operating frequency of the fluorescent lamp ballast, the fluorescent lamp capable of generating light having a second intensity based on the different power.

5. The method of claim 1, [wherein] *further comprising*:

*within* the RC network [comprises], *coupling each of* a plurality of capacitors[, each capacitor coupled] to one of a plurality of transistors, each transistor having a gate operable to receive one of [a] *the* plurality of control signals; and selecting the operating frequency of the fluorescent lamp ballast [comprises] *by* setting an overall capacitance in the RC network by enabling one or more of the transistors.

*6. A method, comprising:*

*detecting at least one of a plurality of input signals received at a fluorescent lamp ballast including a plurality of sample and hold circuits and a decoder, each of the sample and hold circuits configured to output a value identifying a presence or absence of one of the input signals;*

*generating an output signal, the output signal associated with a power level that is based on a plurality of control signals generated by the decoder based on the values from the sample and hold circuits; and*

*receiving the output signal at a fluorescent lamp configured to generate light, wherein an intensity of the light is based on the power level associated with the output signal.*

*7. The method of claim 6, wherein each combination of the plurality of input signals corresponds to a different power level and the fluorescent lamp ballast is configured to generate an output signal for each of the different power levels.*

*8. The method of claim 6, wherein a detector within the fluorescent lamp ballast is configured to detect the at least one of the plurality of input signals, the detector comprising the sample and hold circuits and the decoder, the method further comprising:*

*generating a signal at an oscillator having a frequency based on at least one of the control signals.*

*9. The method of claim 8, further comprising:*

*amplifying the signal generated by the oscillator to produce an amplified signal; and*

*generating the output signal in a tank circuit using the amplified signal.*

*10. The method of claim 9, wherein the fluorescent lamp ballast includes a power amplifier amplifying the signal, and wherein the tank circuit comprises an inductor-capacitor resonant tank circuit.*

*11. The method of claim 8, wherein the frequency of the signal generated by the oscillator is based on at least one of the control signals.*

*12. The method of claim 11, wherein each of the control signals is configured to adjust at least one of: a capacitance in the oscillator, a resistance in the oscillator, an adjustable current source used to charge a capacitance in the oscillator, and a control voltage used by the oscillator, and wherein the oscillator generates the signal such that the frequency of the signal is based on at least one of: the capacitance in the oscillator, the resistance in the oscillator, a current provided by the adjustable current source, and the control voltage.*

*13. The method of claim 7, wherein the plurality of control signals adjust the capacitance in the oscillator, wherein the oscillator comprises a plurality of transistors coupled to a plurality of capacitors, the transistors having gates each configured to receive one of the plurality of control signals.*

*14. The method of claim 6, wherein the plurality of input signals comprise alternating current input voltages.*

*15. A method, comprising:*

*detecting at least one of a plurality of input signals using a plurality of sample and hold circuits and a decoder, each of the sample and hold circuits configured to output a value identifying a presence or absence of one of the input signals, the decoder configured to generate a plurality of control signals based on the values from the sample and hold circuits;*

*generating a signal having a frequency based on the control signals and responsive to the at least one detected input signal;*

*amplifying the signal to produce an amplified signal;*

*generating an output signal using the amplified signal; and*

*providing the output signal to a fluorescent lamp, the output signal associated with a power level that is based on the frequency of the amplified signal, the fluorescent lamp configured to receive the output signal and generate light, wherein an intensity of the light is based on the power level associated with the output signal.*

*16. The method of claim 15, further comprising:*

*detecting the at least one of the plurality of input signals by detecting whether a first input voltage is present on a first input and detecting whether a second input voltage is present on a second input.*

*17. The method of claim 16, wherein the sample and hold circuits comprise:*

*a first flip-flop configured to output a first value indicating whether the first input voltage is present on the first input; and*

*a second flip-flop configured to output a second value indicating whether the second input voltage is present on the second input.*

*18. The method of claim 17, wherein the control signals adjust at least one of: a capacitance in an oscillator generating the signal, a resistance in the oscillator, an adjustable current source used to charge a capacitance in the oscillator, and a control voltage used by the oscillator.*

*19. The method of claim 18, wherein the control signals adjust the capacitance in the oscillator, and wherein the oscillator comprises a plurality of transistors coupled to a plurality of capacitors, the transistors having gates configured to receive the plurality of control signals, wherein a capacitance provided by the plurality of capacitors is varied using the control signals and the plurality of transistors.*

*20. The method of claim 19, wherein the oscillator further comprises a plurality of comparators configured to compare a charge stored on the plurality of capacitors to a plurality of reference voltages and a flip-flop configured to receive outputs from the plurality of comparators and generate the signal.*

* * * * *